US011386155B2

(12) United States Patent
Nowakiewicz et al.

(10) Patent No.: US 11,386,155 B2
(45) Date of Patent: Jul. 12, 2022

(54) FILTER EVALUATION IN A DATABASE SYSTEM

(71) Applicant: SingleStore, Inc., San Francisco, CA (US)

(72) Inventors: Michal Nowakiewicz, Redmond, WA (US); Connor Gregory Watts, Seattle, WA (US)

(73) Assignee: SingleStore, Inc., San Francisco, CA (US)

( * ) Notice: Subject to any disclaimer, the term of this patent is extended or adjusted under 35 U.S.C. 154(b) by 178 days.

(21) Appl. No.: 16/366,704

(22) Filed: Mar. 27, 2019

(65) Prior Publication Data
US 2020/0311141 A1    Oct. 1, 2020

(51) Int. Cl.
*G06F 16/22* (2019.01)
*G06F 16/901* (2019.01)
*G06F 16/953* (2019.01)
*G06F 16/25* (2019.01)

(52) U.S. Cl.
CPC ........ *G06F 16/9027* (2019.01); *G06F 16/252* (2019.01); *G06F 16/953* (2019.01)

(58) Field of Classification Search
CPC ... G06F 16/9027; G06F 16/953; G06F 16/252
See application file for complete search history.

(56) References Cited

U.S. PATENT DOCUMENTS

| 5,694,591 | A | * | 12/1997 | Du | G06F 16/2471 |
| 6,470,335 | B1 | * | 10/2002 | Marusak | G06F 16/2454 |
| 2009/0259641 | A1 | | 10/2009 | Balmin et al. | |
| 2011/0055197 | A1 | * | 3/2011 | Chavan | G06F 16/2454 707/713 |
| 2016/0098378 | A1 | * | 4/2016 | Griglak | G06F 17/18 708/190 |
| 2016/0299947 | A1 | | 10/2016 | Pangeni et al. | |

OTHER PUBLICATIONS

Lee, Minsoo, Yun-mi Kim, and Yoon-kyung Lee. "A Two-Step Approach for Tree-Structured XPath Query Reduction." International Journal of Computer and Information Engineering 1.10 (2007): 3342-3347 (Year: 2007).*

(Continued)

*Primary Examiner* — William B Partridge
*Assistant Examiner* — Erich Alexander Fischer
(74) *Attorney, Agent, or Firm* — EIP US LLP

(57) ABSTRACT

A computer-implemented method of evaluating a set of filter parameters being represented by a filter tree comprising a plurality of nodes. The method can include identifying whether a node is a root of a sub-tree comprising other nodes of the filter tree; generating a cost for said node by processing a sample input comprising a plurality of data items of a data source using the filter parameter and measuring the time taken for the plurality of data items to be processed; and determining a selectivity of said node based on an output of its filter parameter as a result of processing the sample input using the filter parameter; then ordering at least some of the plurality of nodes of the filter tree having the same parent node based on their relative costs and selectivities, for use in generating an ordered filter tree.

11 Claims, 9 Drawing Sheets

(56) References Cited

OTHER PUBLICATIONS

Ming-Chuan Wu. 1999. Query optimization for selections using bitmaps. SIGMOD Rec. 28, 2 (Jun. 1999), 227-238. DOI:https://doi.org/10.1145/304181.304202 (Year: 1999).*

S. Herfert, J. Patra and M. Pradel, "Automatically reducing tree-structured test inputs," 2017 32nd IEEE/ACM International Conference on Automated Software Engineering (ASE), 2017, pp. 861-871, doi: 10.1109/ASE.2017.8115697 (Year: 2017).*

Alberto Martelli and Ugo Montanari. 1978. Optimizing decision trees through heuristically guided search. Commun. ACM 21, 12 (Dec. 1978), 1025-1039. DOI:https://doi.org/10.1145/359657.359664 (Year: 1978).*

International Search Report and Written Opinion dated May 25, 2020 for PCT Application No. PCT/US2020/019729.

Nowakiewicz et al., "BIPie: Fast Selection and Aggregation on Encoded Data using Operator Specialization", SIGMOD'18, Jun. 10-15, 2018, Houston, TX, United States of America.

* cited by examiner

FILTER EVALUATION IN A DATABASE SYSTEM

BACKGROUND

Field of the Disclosure

Embodiments disclosed herein relate to query processing in a database system, and, more specifically, methods and systems for increasing the efficiency of filtering processes carried out in response to receiving a query.

Description of the Related Technology

As technologies advance, the amount of information stored in electronic form and the desire for real-time or pseudo real-time ability to search, organize and/or manipulate such information is ever increasing. Database management systems, sometimes also referred to as databases and data warehouses, are designed to organize data in a form that facilitates efficient search, retrieval or manipulation of select information. Typical database management systems allow a user to submit a "query" or call one or more functions in a query language for searching, organizing, retrieving and/or manipulating information that satisfies particular conditions.

In certain database management systems, in order to process a query against data within a database, the data may be input to a filter defined by the query. The filter may have associated performance characteristics affecting how the filter processes the data and consequently, the time taken to respond to the query. It would be advantageous to reduce the time spent processing queries and thereby shorten the time taken to return results of queries.

SUMMARY

According to a first aspect of the present disclosure there is provided a computer-implemented method of evaluating a set of filter parameters, the set of filter parameters being represented by a filter tree comprising a plurality of nodes of at least one parent node and at least one child node and each node contains a filter parameter, the method comprising: traversing the filter tree by, for each node of the plurality of nodes: identifying whether said node is a root of a sub-tree comprising other nodes of the filter tree; generating a cost for said node by processing a sample input comprising a plurality of data items of a data source using the filter parameter and measuring the time taken for the plurality of data items to be processed, wherein if said node is identified as a root of a sub-tree, said cost is also based on a determined cost and selectivity of the other nodes of the sub-tree; and determining a selectivity of said node based on an output of its filter parameter as a result of processing the sample input using the filter parameter; and ordering at least some of the plurality of nodes of the filter tree having the same parent node based on their relative costs and selectivities, for use in generating an ordered filter tree for the set of filter parameters.

The traversal and subsequent ordering may be part of a runtime profiling analysis performed by a database management system. This has a direct effect on the performance characteristics of the filter tree, such as cost, and consequently can reduce the time that the filter tree uses to process inputs of data items, thereby reducing the time taken to return query responses. In addition, embodiments enable consistent evaluation of filter parameters of different filter types, such as Bloom filters, other join-related filters, and filters on encoded data such as integer/string run length encoded filters. Furthermore, the first aspect provides dynamic re-ordering of filter parameters to enhance query processing.

According to a second aspect of the present disclosure there is provided an ordered filter tree generated in accordance with the method described above. Such an ordered filter tree consists of filter parameters ordered based on their cost and selectivity performance characteristics. In this way, the ordered filter tree is efficient in processing inputs of data items and enhances performance of a database management system in generating a query response.

Further, there is provided a computer-implemented method of using the ordered filter tree of the second aspect to execute a query received by a database management system, the method comprising: processing an input comprising a plurality of data items against the ordered filter tree; obtaining an output from the filter tree in response to said processing, the output being representative of at least one data item of the plurality of data items that satisfies each of the filter parameters of the ordered filter tree; and generating a query response that includes the output.

Using the ordered filter tree of the second aspect enables efficient processing and execution of a received query and thus a reduction in time to provide a response to said query.

BRIEF DESCRIPTION OF THE DRAWINGS

Various features of the present disclosure will be apparent from the detailed description which follows, taken in conjunction with the accompanying drawings, which together illustrate, features of the present disclosure, and wherein.

DETAILED DESCRIPTION OF CERTAIN EMBODIMENTS

Figure 1:
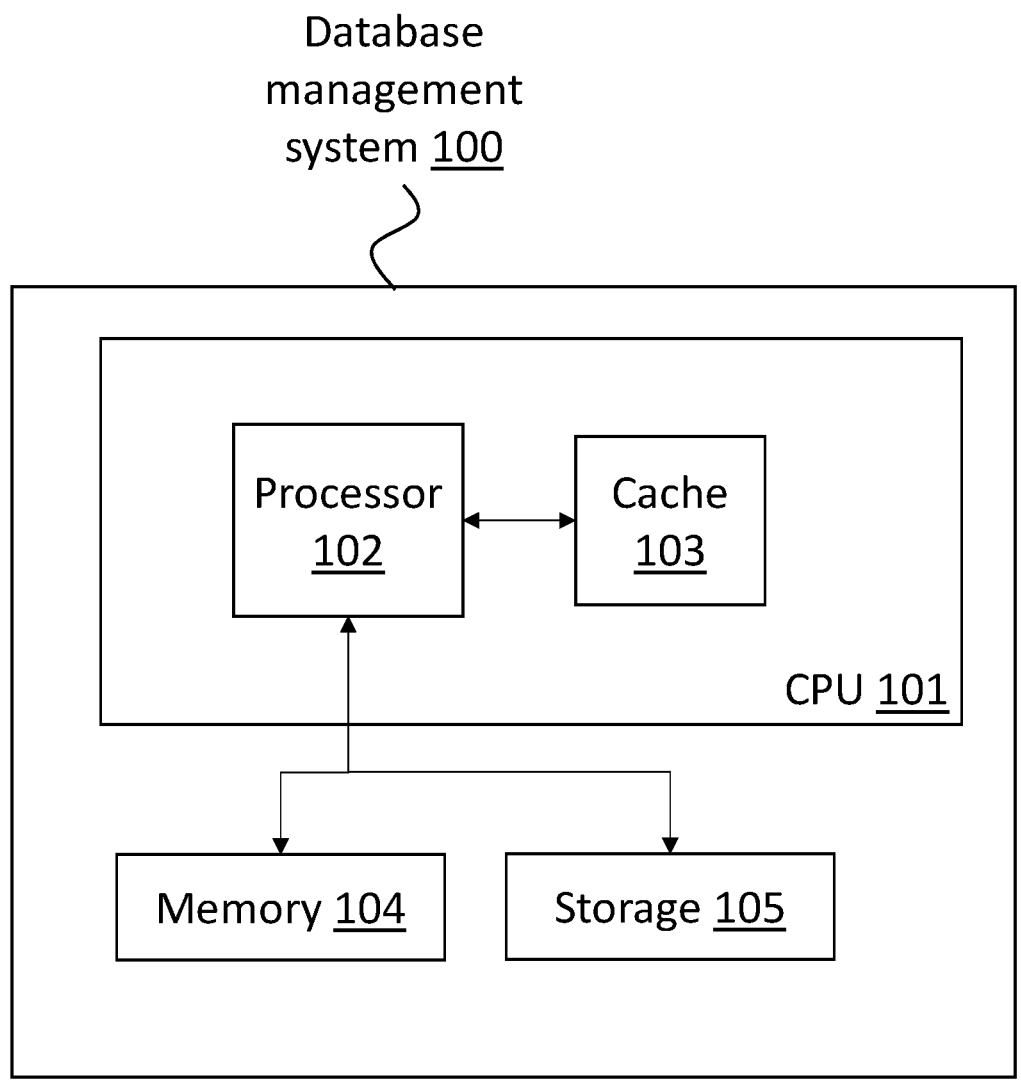
FIG. 1 is a schematic diagram of a system for executing a query made against a collection of data, according to an example.

FIG. 1 is a schematic diagram illustrating a database management system 100 to which embodiments described herein have particular application. The database management system, DBMS, 100 processes and executes a query made against a collection or sample of data. The DBMS 100 has a central processing unit, CPU, 101, a memory 104, and storage 105. The CPU 101 includes a processor 102 and a cache 103. One or more of the cache 103, memory 104, and storage 105 contain computer-readable instructions, that when executed by the processor 102, cause the processor 102 to process and execute a query, explained in more detail with reference to FIGS. 2 to 10. In addition, the cache 103 may be configured to hold data and/or computer-readable instructions received from one or more of the processor 102, memory 104, and storage 105.

Although CPU 101 is illustrated as having one processor 102 and one cache 103, in another example a plurality of such features may be present in each of one or more CPUs, e.g., providing one or more multi-core processors for system 100. Moreover, any discussion of operations performed by processor 102 may indicate operations performed by a single processor 102, or operations performed by different processors of a plurality of similar processors.

Figure 2:
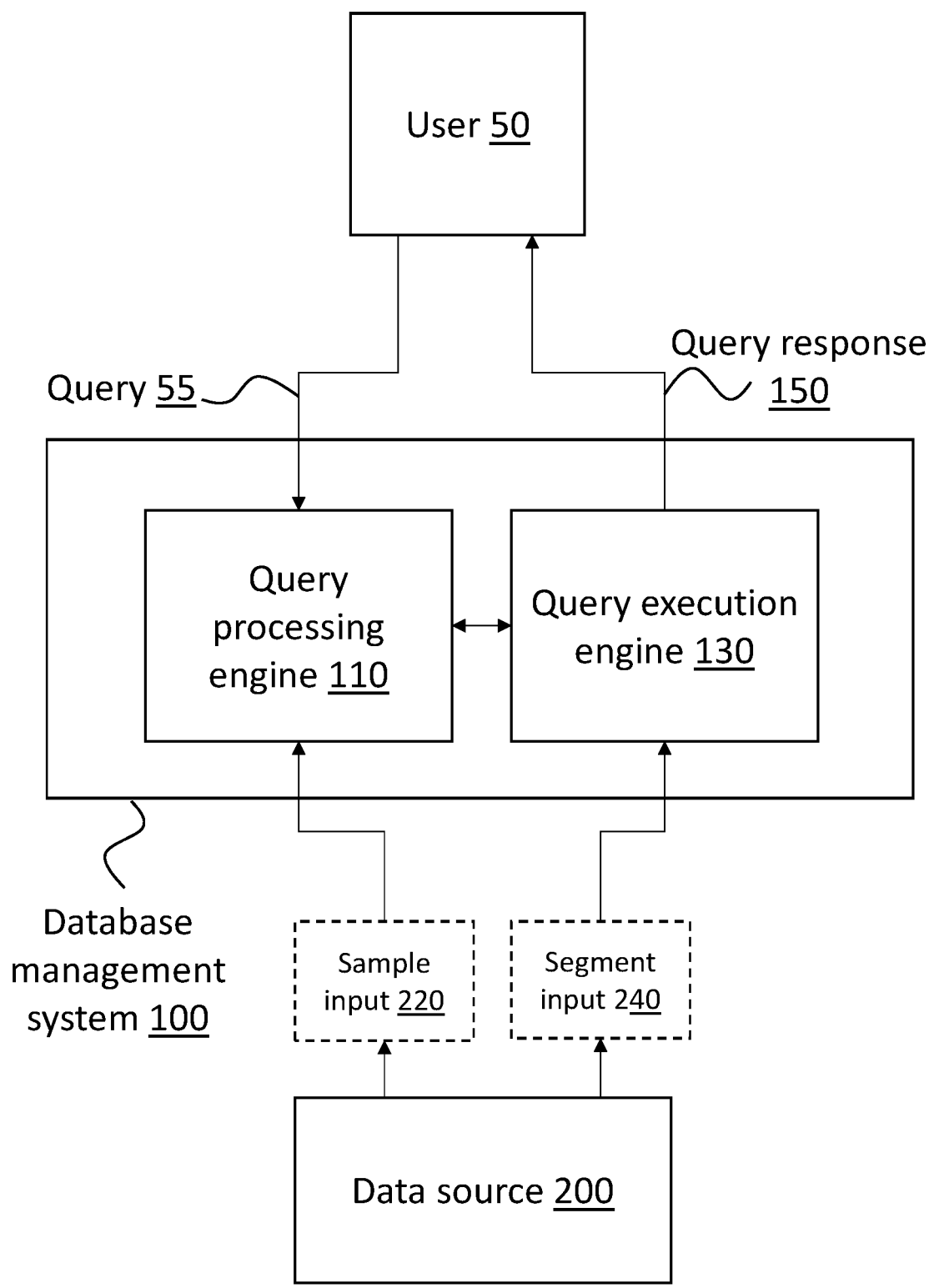
FIG. 2 is a further schematic diagram of the system of FIG. 1, according to an example.

FIG. 2 is another schematic diagram of the DBMS 100 of FIG. 1. The DBMS 100 is communicatively coupled to a user computing system 50 and a data source 200. On execution of computer-readable instructions by the processor 102 (FIG. 1) the DBMS 100 is configured to launch a query processing engine 110 and a query execution engine 130.

In use, the DBMS 100 receives a query 55 from the user computing system 50. The query 55 defines a set of filter parameters that are used to process all or some of the data stored by the data source 200 and provided to the DBMS 100. Any data that satisfies the query 55 can be provided as part of a response, such as a query response 150, to the user computing system 50. The set of filter parameters defined by the query 55 may include the following: one or more operators; and one or more operands. In one example, the one or more operators may include one or more Boolean operators, such as AND or OR operators. In a further example, the one or more operands may include one or more callback functions.

In the example of FIG. 2, the query processing engine 110 processes the query 55 with respect to a sample input 220 provided by the data source 200 to the DBMS 100. In one example, the sample input 220 comprises a plurality of data items of the data source 200, such as a plurality of rows of data of the data source 200. In a further example, the data source 200 may store data in a column-wise format.

The processing of the query 55 involves evaluating each of the filter parameters defined by the query 55, either independently or in combination with others, by invoking the respective filter parameters to interrogate the sample input and analyzing performance characteristics of the invoked parameters based on the results of the interrogation. As an example, performance characteristics may include one or both of cost and selectivity. In one example, said evaluation of each filter parameter of the query may be part of a runtime profiling analysis performed by the DBMS 100.

As a result of the interrogation of the sample input 220, each filter parameter may generate an output that contains the data items of the sample input that may require further evaluation by at least one other filter parameter before a determination can be made as to whether those data items satisfy the query 55 as a whole, and thus form part of the query response 150. Accordingly, the data items of an output either satisfy or do not satisfy the filter parameter(s) against which they have been interrogated, depending on the filter parameter(s) in question. Where the filter parameters are invoked one after the other, the output of a filter parameter has a direct effect on the data items that are interrogated by the next filter parameter that is invoked.

For instance, where a first filter parameter is an AND operator, data items that satisfy a second filter parameter, that is an operand of the AND operator form the output of the second filter parameter and are subsequently interrogated by a third filter parameter that is also an operand of the AND operator, and so on. Alternatively, where a first filter parameter is an OR operator, data items that do not satisfy a second filter parameter that is an operand of the OR operator form the output of the second filter parameter and are subsequently interrogated by a third filter parameter that may be another operand of the OR operator.

In other words, the output of each filter parameter that is an operand of an operator may be the sample input for the next filter parameter that is another operand of the same operator (filtered in accordance with all preceding filter parameters), where the content of the output of each operand is dependent on the type of operator to which it relates, for instance, whether the operator is an AND operator or an OR operator.

In one example, an output generated as a result of a filter parameter interrogating a sample input may be represented as a bit or byte vector containing set bits representative of one or more data items of the sample input 220 that are present in the output.

In relation to filter parameters that are operands of an operator, their respective outputs may be combined to provide an output for a corresponding filter expression that consists of said operands and said operator. Such an output may then be passed to a subsequent filter parameter(s) of the same query 55 for further interrogation.

In a further example, a bit vector may be generated or updated in accordance with outputs of successive filter parameters. For instance, after multiple filter parameters have been evaluated, a first bit vector may be representative of data items that require further evaluation by other, not yet evaluated, filter parameters that are defined by the query 55, while in some examples the data items represented by the first bit vector may satisfy all preceding filter parameters. It is understood that data items corresponding to those represented by the first bit vector would be provided as an input to the next filter parameter(s) of the query 55 that are to be evaluated.

The first bit vector may be generated based on a combination of bit vectors representative of respective outputs of each of the multiple filter parameters, where one or more of the bit vectors corresponding to outputs of the multiple filter parameters may be inverted in order to represent data items that have passed the preceding filter parameters, for example, where a bit vector is associated with a filter parameter that is an operand of an OR operator.

As a simplified example, "x=EVEN AND x>5" is a filter expression corresponding to a received query and the data items being filtered are: [1, 4, 7, 8, 10]. A first filter parameter of the filter expression can be considered as "x=EVEN", a second filter parameter of the filter expression can be considered as "x>5", and a third filter parameter of the filter expression can be considered as "AND". In this scenario, the first and second filter parameters are operands of the third filter parameter, which is an operator.

The filter parameters of the filter expression are evaluated one after the other. In this example, the first filter parameter "x=EVEN" is evaluated first and the second filter parameter "x>5" is evaluated after the first filter parameter. The data items that satisfy the first filter parameter are: [4, 8, 10] and the data items that do not satisfy the first filter parameter are [1, 7].

Since the third filter parameter contains an AND operator, the data items that satisfy the first filter parameter require further consideration before a determination can be made as to whether they satisfy the whole filter expression. Consequently, the output of the first filter parameter contains the data items that satisfy the first filter parameter. A bit vector representative of said output is 01011, where each bit corresponds to a respective one of the input data items [1, 4, 7, 8, 10] and each set bit (that is, a "1") corresponds to a data item that satisfies the first filter parameter.

The second filter parameter is then interrogated by the data items [4, 8, 10], so these data items are the sample input to the second filter parameter.

The data items of the sample input that satisfy the second filter parameter are [8, 10]. A bit vector representative of the output of the second filter parameter is 011, where each bit corresponds to a respective one of the input data items [4, 8, 10], and the set bits correspond to the data items [8, 10]. Therefore, the final filter result for the filter expression can be represented as the final bit vector 00011, where each bit corresponds to a respective one of the original data items [1, 4, 7, 8, 10] and the set bits correspond to the data items that satisfy both the first and second parameters and thus the filter expression "x=EVEN" AND x>5".

If the query consists of other filter expressions or parameters, the data items [8, 10] corresponding to the bit vector 00011 would be input to a first of the other filter expressions or parameters in order to undergo further filtering, otherwise, a query response can be generated based on the data items [8,10].

In another simplified example, "x<10 OR x>20" is a filter expression corresponding to a received query and the data items to be filtered are: [5, 15, 25, 14, 4, 24]. A first filter parameter of the filter expression can be considered as "x<10", a second filter parameter of the filter expression can be considered as "x>20", and a third filter parameter of the filter expression can be considered as "OR". In this example, the first and second filter parameters are operands of the third filter parameter, which is an operator.

As for the previous example, the filter parameters of the filter expression are evaluated one after the other. In this example, the first filter parameter "x<10" is evaluated first and the second filter parameter "x>20" is evaluated after the first filter parameter. The data items that satisfy the first filter parameter are: [5, 4] and the data items that do not satisfy the first filter parameter are [15, 25, 14, 24]. Since the third filter parameter contains an OR operator, the data items that do not satisfy the first filter parameter require further consideration before a determination can be made as to whether they satisfy the whole filter expression. Consequently, the output of the first filter parameter contains the data items that do not satisfy the first filter parameter. A bit vector representative of the output [15, 25, 14, 24] is 011101, where, as explained above, each bit corresponds to a respective one of the input data items [5, 15, 25, 14, 4, 24] and each set bit corresponds to a data item that does not satisfy the first filter parameter.

The second filter parameter is then interrogated by the data items [15, 25, 14, 24], so these data items are the sample input to the second filter parameter.

The data items of the sample input that satisfy the second filter parameter are [25, 24] and the data items that do not satisfy the second filter parameter are [15, 14]. A bit vector representative of data items that do not satisfy the second filter parameter is 1010, where each bit corresponds to a respective one of the input data items [15, 25, 14, 24] and the set bits correspond to the data items [15, 14].

The two bit vectors 011101 and 1010 are then combined to form a final bit vector having set bits representative of data items that do not satisfy the filter expression where the final bit vector contains a bit for each data item part of the original input, so for each of [5, 15, 25, 14, 4, 24]. The ith bit of the final bit vector is set if the ith bit is set in the first bit vector and the jth bit is set in the second bit vector, where j is the number of bits set in the first bit vector before i.

In this example, the first bit (at position 0, see Table below) is not set in the first bit vector 011101, which means the first bit of the final bit vector is not set. The second bit (in position 1) in the first bit vector is set 011101 and there are zero bits set before the second bit in the first bit vector, which means that the bit at the zero position in the second bit vector is examined: 1010. The bit at the zero position is set in the second bit vector so the second bit in the final bit vector is set. This process continues for the rest of the bit positions in the final bit vector, as shown in the table below:

| Bit position | 0 | 1 | 2 | 3 | 4 | 5 |
| --- | --- | --- | --- | --- | --- | --- |
| First bit vector | 0 | 1 | 1 | 1 | 0 | 1 |
| Second bit vector | 1 | 0 | 1 | 0 | | |
| Final bit vector | 0 | 1 | 0 | 1 | 0 | 0 |
| Inverted bit vector | 1 | 0 | 1 | 0 | 1 | 1 |

This results in the final bit vector of 010100, which represents data items [15, 14] that do not satisfy the filter expression "x<10 OR x>20". To determine a final filter result, which is the data items that passed or satisfied the filter expression as a whole, the final bit vector may be inverted to 101011.

If the query consists of other filter expressions or parameters, the data items [5, 25, 4, 24] corresponding to the inverted bit vector 101011 would be input to a first of the other filter expressions or parameters in order to undergo further filtering, otherwise, a query response can be generated based on the data items [5, 25, 4, 24].

Following the invocation of filter parameters and interrogation of sample inputs, performance characteristics of each of the filter parameters can be analyzed based on results of said interrogation, such as the outputs of each filter parameter and/or a bit vector representative of the same. As a result of analyzing the performance characteristics of the filter parameters, the filter parameters may be re-ordered relative to one another to enhance performance of the DBMS 100 in processing the query 55 against other data items of the data source 200.

After the ordering of the filter parameters based on their relative performance characteristics, the query execution engine 130 applies the re-ordered filter parameters to other data items of the data source 200, such as a segment input 240 to thereby filter the segment input 240. In most cases, the segment input 240 contains a greater number of data items than the sample input 220. As such, the sample input 220 can be understood as a "test sample" that is used to establish a more efficient and less costly order of the filter parameters before these parameters are applied to a much larger quantity of data such as the segment input 240. In this way, the majority of data of the data source 200 is filtered in a more efficient and cost-effective manner, thereby enhancing query processing by the DBMS 100.

In one example, the segment input 240 may contain $\times 10^n$ number of data items compared to the sample input 220. In one example, the sample input 220 may contain 4096 data items. In addition, the query 55 may be executed against contiguous segments of data stored by the data source 200, where each segment may be processed entirely before advancing to the next segment, thus, in a sequential manner The result of the filtering of the segment input 240 (for example, the final output or bit vector generated by the filtering) may form the basis of the query response 150. In one example, the query processing engine 110 may re-evaluate the performance characteristics of the filter parameters for every x data items filtered using the re-ordered parameters and based on the result of the filtering of the segment input 240. For example, re-evaluation may occur after each segment input 240 has been filtered by the query execution engine 130.

Filter Tree

Figure 3:
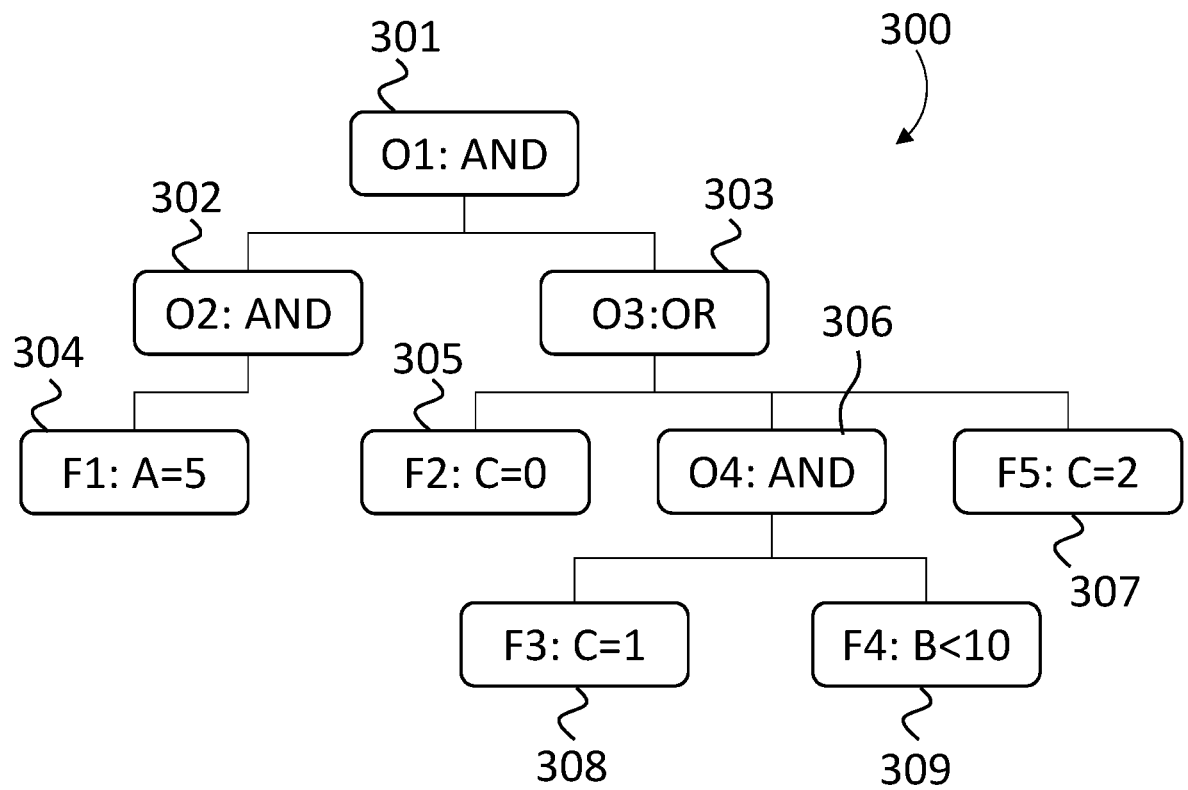
FIG. 3 is a simplified diagram of a filter tree, according to an example.

In the example of FIG. 3, the query 55 is defined by the following expression, E1:

$(A=5)$ AND $((C=0)$ OR $(C=2)$ OR $(C=1)$ AND $(B<10)))$             E1:

The operators (highlighted in bold) are AND/OR operators and are treated as n-ary operators. Using n-ary operators increases the likelihood of determining an ordering of filter parameters of the query 55 that enhances the performance characteristics of the filter parameters, and thus, increases the efficiency in processing a query and reducing the time taken to provide a query response. As an example, the number of possible orderings of filter parameters is greater when using n-ary operators compared to using binary operators because the filter parameters of a binary operator, that is the operands, are arranged in pairs with no movement possible between different pairs of operands. For instance, a filter expression "f1 OR f2 OR f3 OR f4" can be modelled, when the OR operators are treated as n-ary operators, as a single operator OR with four operands f1, f2, f3, and f4, which are can be ordered independently from one another to arrive at the optimal ordering: f1, f3, f2, f4, in accordance with the method described herein. However, when the OR operators are treated as binary operators the filter expression is modelled whereby the operands are provided in pairs: f1 OR f2; and f3 OR f4, with limited flexibility in re-ordering. Consequently, the number of possible orderings of the operands is reduced for the binary operator model and the optimal ordering f1, f3, f2, f4 cannot be achieved.

In another example, the operators may be treated as binary operators and as described above, whilst different orderings of the operands of binary operators are possible, the number of possible orderings is often less than the number of possible orderings when n-ary operators are used.

The filter parameters defined by the query 55 may be represented using Boolean logic. In one example, Boolean logic representative of the query 55 may be arranged in a tree data structure, as illustrated by a so-called filter tree 300 of FIG. 3.

The filter tree 300 of FIG. 3 depicts one of multiple possible representations of the above expression representing query 55. Indeed, each of the multiple possible representations of the query 55 may comprise a different order of filter parameters, with each order having a corresponding efficiency of executing the query that can be derived from analyzing the performance characteristics of the filter parameters in relation to one another.

The filter tree 300 may be representative of different types of filters such as Bloom filters, other join-related filters, and filters on encoded data such as integer/string run length encoded filters. The filter tree 300 is generated by the DBMS 100 in response to receiving the query 55 and is passed to the query processing engine 110 (FIG. 2).

Exemplary tree 300 comprises a plurality of nodes 301-309. Node 301 is the root of the filter tree 300 and is therefore only a parent node in the tree of nodes. Nodes 302, 303, and 306 are internal nodes of the filter tree 300 and are thereby both parent and child nodes. Nodes 304, 305, 307, 308, and 309 are leaf nodes of the filter tree 300 and are thereby child nodes.

Each of the plurality of nodes 301-309 contains a filter parameter and collectively the filter tree 300 represents the query 55, where a plurality of nodes may define a filter expression that is a portion of the overall query. In this example the parent nodes 301, 302, 303, and 306 contain operators O1-O4, respectively, and the leaf nodes 304, 305, 308, 309, and 307 contain operands in the form of callback functions F1-F5, respectively. As an example, nodes 306, 308 and 309 each contain a filter parameter and collectively define the filter expression: "C=1 AND B<10". When the operators are treated as binary operators this means that within the tree each operator has, at most, two child nodes. Whereas, when the operators are treated as n-ary operators, each operator can have more than two child nodes and the possible orderings of the more than two child nodes can be flexibly changed because the operands are not limited to pairings, as described above.

Transforming the Filter Tree

Figure 4:
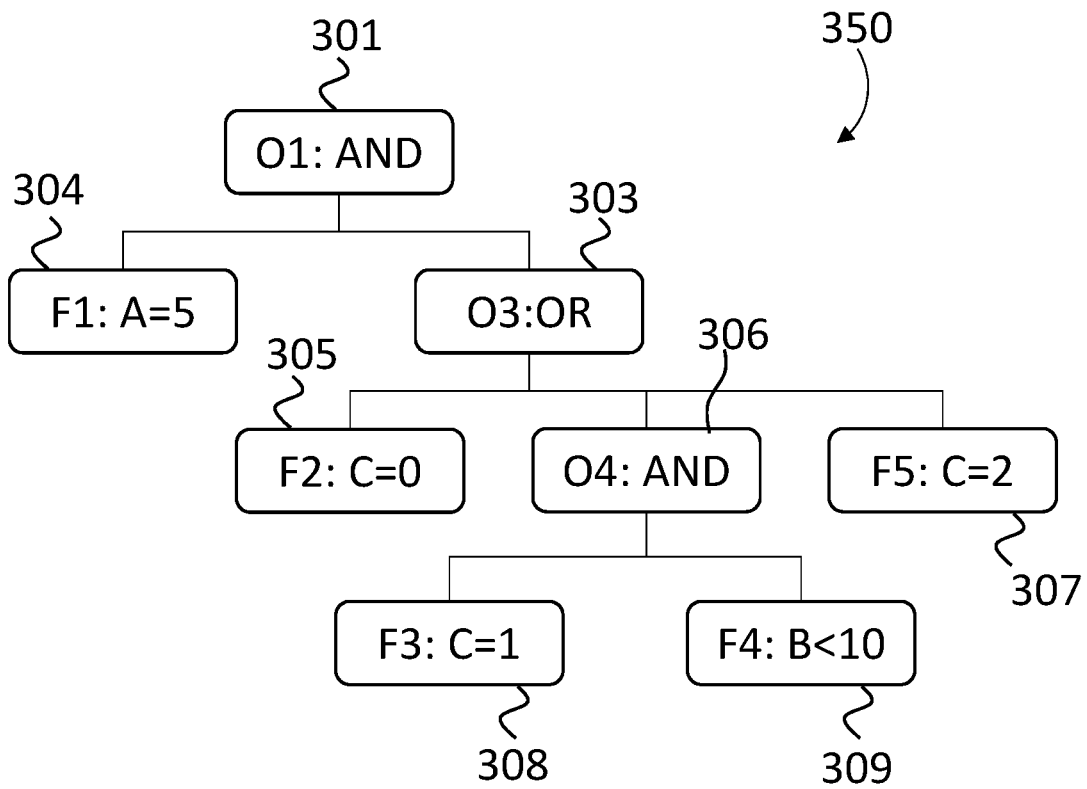
FIG. 4 is a simplified diagram of a transformed filter tree, according to an example.

Prior to evaluating the performance characteristics of the filter tree 300, a pre-processing step may be performed, which involves transforming the filter tree 300 into a transformed filter tree, such as the filter tree 350 of FIG. 4. This pre-evaluation transformation of the filter tree identifies and removes nodes of the original tree that are deemed to be redundant. In this way, the query processing performed by the DBMS 100 is enhanced by focusing the evaluation on relevant nodes, and thus, relevant filter parameters, thereby avoiding CPU time (and cost) in unnecessarily evaluating all nodes (and all filter parameters). In some examples, this pre-processing step may return a null result because none of the nodes of the original filter tree are identified as redundant, in which case a transformation of such a filter tree would not be carried out.

In one example the filter tree 300 (FIG. 3) can be transformed into the filter tree 350 (FIG. 4) by:
  i. identifying and replacing any node that has a single child node with that child node; and
  ii. identifying and replacing any parent node that contains the same filter parameter as its own parent node, with the child node of the parent node (this can happen recursively).

Post transformation by steps (i) and (ii), each parent node has a plurality of child nodes, none of which contains the same filter parameter as that of the parent node. In addition, each level of the tree only has one type of inner operator node (either "AND" or "OR").

In another example, only one of steps (i) and (ii) may be used to transform the filter tree 300. It is to be understood that there are a number of different ways to transform a filter tree by removing redundant nodes. An underlying driver for how to carry out such transformation is that any benefit gained outweighs the cost of carrying out the transformation.

Referring to the example depicted by FIGS. 3 and 4, in transforming the tree 300 to the tree 350 in accordance with the steps (i) and (ii), it can be seen that the node 302 (FIG. 3), which has a single child node 304 and also contains the same operator as its parent, node 301, is replaced by its child node 304 within the filter tree 350. It is to be understood that steps (i) and (ii) may be performed either in the order of (i) then (ii); (ii) then (i); or concurrently.

Figure 5:
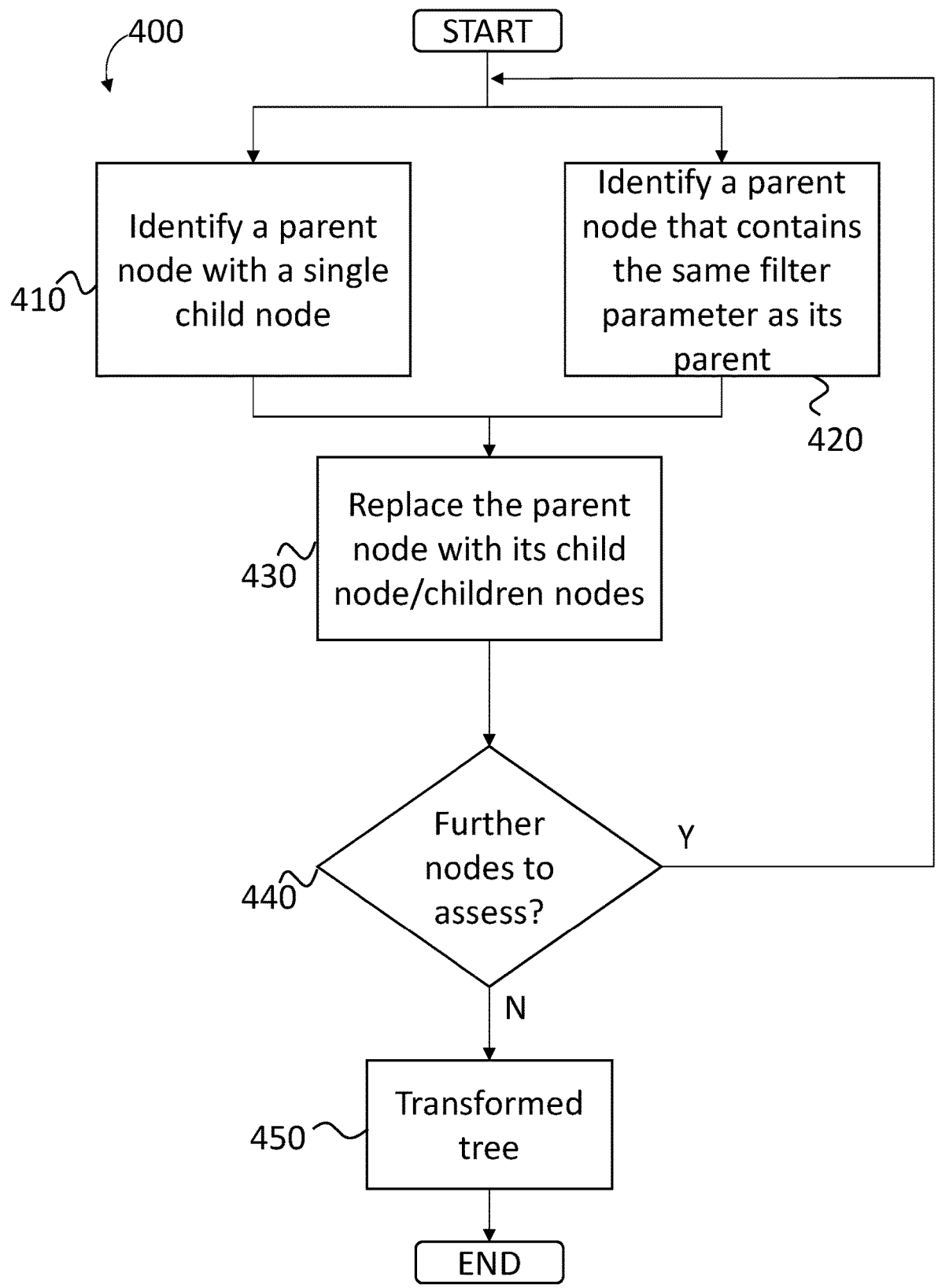
FIG. 5 is a flowchart of a method of transforming a filter tree, according to an example.

FIG. 5 is a flowchart of a method 400 of transforming a filter tree, such as filter tree 300 (FIG. 3).

The method 400 starts at blocks 410 and 420. At block 410, the filter tree 300 is assessed to identify a parent node with a single child node. At block 420, the filter tree 300 is assessed to identify a parent node that contains the same filter parameter as its parent.

Next, the method 400 proceeds to block 430 where the identified parent node(s) is replaced by its child node (where there is a single child node) and its children nodes (where there is more than one child node). Following the replacement(s), at block 440, a decision is made as to whether there are further nodes within the filter tree 300 to assess. If there are further nodes to assess, the yes, Y, branch is followed back to blocks 410 and 420. If there are no further nodes to asses, the no, N, branch is followed to block 450.

At block 450, a transformed filter tree, such as the filter tree 350 (FIG. 4) is generated.

It is to be understood that the identification and replacement steps of blocks 410 and 430 and blocks and 420 and 430 may be performed one after the other: 410 followed by 420; 420 followed by 410; 410 and 430 followed by 420 and 430; or 420 and 430 followed by 410 and 430.

Evaluating the Transformed Filter Tree

Figure 6:
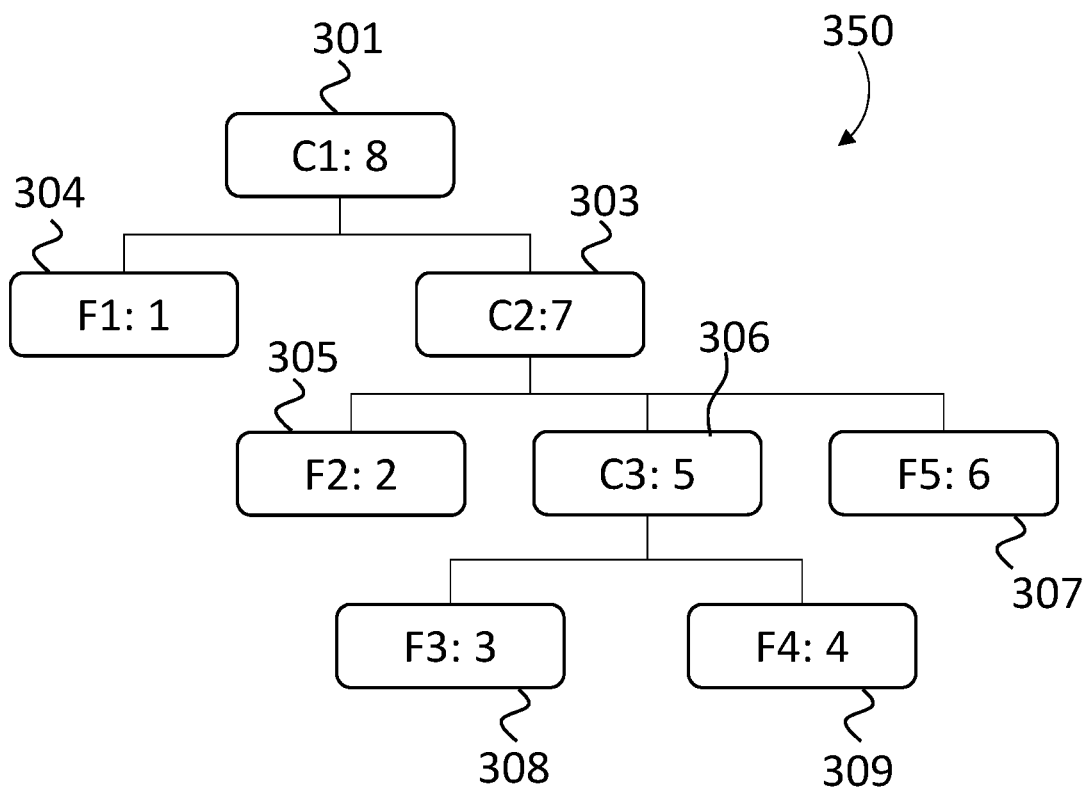
FIG. 6 is a further schematic diagram of the transformed filter tree of FIG. 4, according to an example.

FIG. 6 is a further schematic diagram of the transformed filter tree 350. The operators of nodes 301, 303 and 306 (O1, O3, O4) are marked as C1, C2, and C3, respectively.

In evaluating the performance characteristics of the filter parameters of the filter tree 350, the tree 350 is traversed, for example in a post-order manner (that is, starting at the left side of the tree then moving to the right side of the tree and starting from leaf nodes and moving up toward the root node, often referred to as bottom-up traversal). Post-order traversal allows for a quick and accurate evaluation of performance characteristics of the filter tree because such traversal is based on the understanding that the output of a first filter parameter has a direct effect on an input to a second, succeeding filter parameter and, thus, the performance characteristics of a node (and its filter parameter) depend on those of its children (and their respective filter parameters), which have already been evaluated.

Numbers are depicted in each of the nodes 301, and 303-309 of the tree 350 to indicate the order in which the nodes (and thus, the filter parameters) of the tree 350 will be assessed using the post-order manner of traversing. In this way, when a particular node is evaluated, the evaluation of nodes below it in the tree 350 will have finished.

Figure 7:
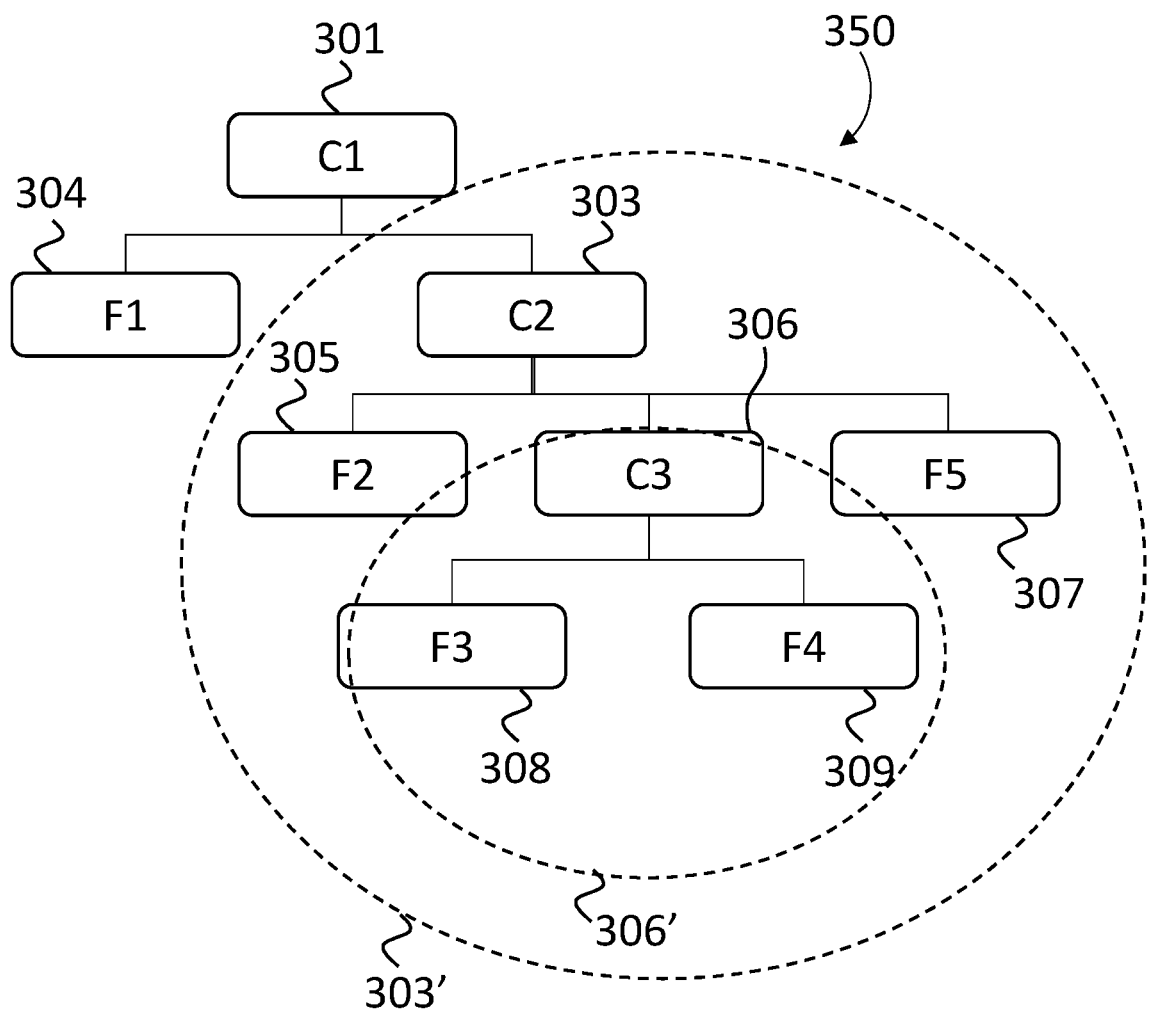
FIG. 7 is a further schematic diagram of the filter tree of FIG. 4, according to an example.

FIG. 7 is a further schematic diagram of the filter tree 350. In this example the filter tree 350 is traversed by, for each node of the plurality of nodes 301 and 303-309, identifying whether the node is a root of a sub-tree comprising other nodes of the filter tree and then evaluating performance characteristics of the node. In the example of FIG. 7, nodes 303 and 306 are roots of sub-trees 303' and 306', respectively, depicted by dashed lines.

As described above, when traversing the filter tree 350 shown in FIG. 6 or 7, performance characteristics of each node, and thus, each filter parameter of the filter tree 350, are evaluated. As part of this evaluation, a cost is generated for each node by processing a sample input, for example, sample input 220 (FIG. 2), comprising a plurality of data items of a data source using the filter parameter of the node and measuring the time taken for the plurality of data items to be processed by the filter parameter. In some examples, based on the measured time taken a cost per data item may be calculated. In one example, the time taken may be measured using a change in a clock of the CPU 101 (FIG. 1).

If the node in question has been identified as a root of a sub-tree, such as nodes 303 and 306 of the tree 350 of FIG. 7, the cost is also based on a determined cost and selectivity of the other nodes (and thus, the other filter parameters), and an established ordering thereof, of the relevant sub-tree. For the example tree 350 shown in FIG. 7, the cost for node 303 is based on the determined cost and selectivity of nodes 305-309 (sub-tree 303') and the cost for node 306 is based on the determined cost and selectivity of nodes 308 and 309 (sub-tree 306'). In addition, for a node that is identified as a root of a sub-tree, an output of its filter parameter may correspond to one or more data items of the sample input that have been determined to satisfy the filter parameters of the other nodes of the sub-tree. Accordingly, after nodes 308 and 309 of the subtree 306' have been evaluated, the output of the subtree 306' corresponds to one or more data items that satisfy the filter parameters of said subtree 306' and may be input to the subtree 303' that, in accordance with the order of evaluation depicted in FIG. 6, contains filter parameters that still require evaluation. In one example, the output of a node that is a root of a sub-tree may be a bit vector, described earlier in the description. Such a bit vector may be updated as the filter tree 350 is traversed.

Also forming part of the aforementioned evaluation is the determination of a selectivity of the node containing the filter parameter under evaluation, which is based on an output of its filter parameter resulting from processing the sample input using the filter parameter. In this example, the selectivity is represented as a probability that a data item will satisfy or pass the filter parameter of the node.

In another example, the selectivity may directly correspond to the number of data items passing a filter parameter rather than a fraction of the entries of the sample input. In this way, the selectivity of a filter parameter is not dependent on the selectivity of all preceding filter parameters of the filter tree and can, instead, be considered as a "local-selectivity". Thus, selectivity for filter parameters further on in the evaluation process is increased slowly (namely, underestimated) in order to increase accuracy of determining selectivity of these later filter parameters over an extended period of time in which multiple sets of data items are filtered.

In the current example, at least some of the plurality of nodes of the filter tree 350 have the same parent node, such as nodes 303 and 304 (parent is node 301), nodes 305-307 (parent is node 303), and nodes 308 and 309 (parent is node 306). This parent-child relationship across the entire filter tree can be used to order the nodes based on their relative costs and selectivities and generate a so-called ordered filter tree. In one example, the traversal and subsequent ordering of the filter tree 350 may be part of a runtime profiling analysis performed by a DBMS, such as DBMS 100 of FIG. 1.

In relation to the ordering of child nodes having the same parent, different possible orderings of different pairs of the child nodes are determined and an ordering for each pair is selected based on an evaluation of the cost and the selectivity of the filter parameters of those child nodes for the different possible orderings, where the overall ordering of the child nodes is based on the selected orderings for each of the pairs of child nodes. In such a scenario, the cost of the parent node is based on a determined cost and selectivity of an established ordering of the filter parameters of the child nodes. As an example, if a node has two child nodes there are two possible ways for the child nodes to be ordered. In this case, the cost of the two possible orderings is determined and one of those orderings is selected based on the cost and selectivity of the two child nodes. Referring back to the earlier simplified example of the filter expression "x=EVEN" AND x>5", the filter parameters "x=EVEN" and "x>5" are operands of the filter parameter "AND" and in the context of a filter tree are considered child nodes of the filter parameter "AND". It is understood that the filter parameters "x=EVEN" and "x>5" may be ordered as "x=EVEN" then "x>5" or "x>5" then "x=EVEN", and cost and selectivity evaluated for each of these orderings.

In another example, if a node has more than two child nodes, each possible pair of nodes is determined and the associated costs for different possible orderings within each possible pair of child nodes is then determined and used to establish an overall ordering for the child nodes. As described earlier, when operators are treated as n-ary operators the number of possible orderings of corresponding operands is often increased compared to the number of possible orderings when the operators are treated as binary operators.

For a first ordering of a pair of nodes, where the parent node contains an AND operator, the following expression, E2, may be used:

$$C(\text{first order}) = c(\text{first node}) + s(\text{first node}) * c(\text{second node}) \quad \text{E2:}$$

where c( ) represents the cost and s( ) represents the selectivity of the entity defined within the brackets.

In expression E2 every data item of the sample input 220 will bear the cost of evaluating the filter parameter of the first node but only a portion of the data items (s(first node)) that pass the filter parameter of the first node will bear the cost of evaluating the filter parameter of the second node.

For a second ordering of the aforementioned pair of nodes, the following expression, E3, may be used:

$$C(\text{second order}) = c(\text{second node}) + s(\text{second node}) * c(\text{first node}) \quad \text{E3:}$$

again, where c( ) represents the cost and s( ) represents the selectivity of the entity defined within the brackets.

In expression E3 every data item of the sample input will bear the cost of evaluating the filter parameter of the second node but only a portion of the data items (s(second node)) that pass the filter parameter of the second node will bear the cost of evaluating the filter parameter of the first node.

As such, for both E2 and E3 whichever filter parameter is evaluated second is not evaluated for any data item that did not pass the filter parameter that was evaluated first.

The selected ordering for the child nodes is the ordering with the lowest cost, determined using the following expression, E4:

$$\text{Selected order} = \text{first order if } C(\text{first order}) < C(\text{second order}) \text{ Otherwise; } = \text{second order} \quad \text{E4:}$$

If orderings have the same cost, then re-ordering of the nodes is not required so no change is made to the ordering of the child nodes, which is to say, to the filter tree.

Referring again to FIG. 7, a worked example of ordering of nodes will now be described.

In this example, the following costs and selectivities are assumed for the callback (F) function filter parameters of the filter tree 350:

$$c(F1)=10; s(F1)=0.1$$

$$c(F2)=5; s(F2)=0.8$$

$$c(F3)=2; s(F3)=0.3$$

$$c(F4)=20; s(F4)=0.05$$

$$c(F5)=5; s(F5)=0.4$$

To evaluate the cost of the node 306 (an AND node), the cost and selectivity of the other nodes of the sub-tree 306', namely, the pair of nodes 308 and 309, are evaluated, by determining the costs of the different orderings of the nodes 308 and 309 and establishing an overall order based on said costs. The different orderings for the nodes 308 and 309 consist of: 308 preceding 309 (or F3 preceding F4—the first ordering); and 309 preceding 308 (or F4 preceding F3—the second ordering).

In accordance with expression E2 above, in this example, the cost of the first ordering is determined to be:

$$c(F3)+s(F3)*c(F4)=2+0.3*20=8$$

And the cost for the second ordering is determined to be:

$$c(F4)+s(F4)*c(F3)=20+0.05*2=20.1$$

Accordingly, the first ordering (F3 preceding F4) has a lower cost than the second ordering and is therefore cheaper. Thus, the first ordering is selected and maintained in the filter tree 350. Having established an ordering for its child nodes, the cost of node 306 can then be evaluated using a sample input and measuring its costs and selectivity, taking into account any overhead in combining the results of F3 and F4. In the context of this worked example, it is assumed that the cost of node 306 (and thus, filter parameter C3)=9 (a cost of a parent node cannot be cheaper than the total cost of its child nodes, in this case F3 preceding F4) and the selectivity=0.02 (a selectivity of a parent node cannot be higher than the minimum selectivity of its child nodes, in this case F3 and F4).

Moving up the tree 350 to node 303 containing the next filter parameter to be evaluated, that is operator C2, the cost and selectivity of each of its child nodes 305, 306, and 307 (containing F2, C3 and F5) are evaluated for different pairs of nodes 305, 306, and 307. In this example, the operator C2 is an OR operator and the expression for evaluating the cost of different orderings of pairs of nodes, where a pair of nodes is a first and a second node, is as follows, E5:

$$C(\text{an order})=c(\text{first/second node})+(1-s(\text{first/second node}))*c(\text{second/first node}) \quad \text{E5:}$$

The nature of the OR operator C2 of node 303 is captured by use of the term $(1-s(\ ))$ in place of $s(\ldots)$ used in E2 and E3 because the filter parameter of the second node of the pair is provided as an input the data items that did not satisfy the filter parameter of the first node (in other words, the filter parameter of the second node will skip the data items that pass the filter parameter of the first node of the pair).

Using the above cost and selectivities for each of the callback functions F2, F5 and for operator C3, the following costs are determined:

F2 vs C3:

$$c(F2)+(1-s(F2))*c(C3)=5+0.2*9=6.8$$

$$c(C3)+(1-s(C3))*c(F2)=9+0.98*5=13.9$$

From this, F2 should precede C3.

F5 vs C3:

$$c(F5)+(1-s(F5))*c(C3)=5+0.6*9=10.4$$

$$c(C3)+(1-s(C3))*c(F5)=9+0.98*5=13.9$$

From this, F5 should precede C3.

To establish the final ordering of F2, C3, and F5 the last comparison is between F2 and F5:

F2 vs F5:

$$c(F2)+(1-s(F2))*c(F5)=5+0.2*5=6$$

$$c(F5)+(1-s(F5))*c(F2)=5+0.6*5=8$$

From this, F2 should precede F5. Thus, the overall ordering should be: F2 followed by F5 followed by C3. Subsequently, the cost and selectivity of C2 in node 303 is evaluated based on the established ordering of its child nodes. In this example, cost (C2)=11 and selectivity (C2)=0.9.

Moving up the tree again to node 301 containing operator C1, the cost and selectivity of each of its child nodes 303, 304 (containing F1 and C2) are evaluated. In this example the operator C1 is an AND operator, and expressions E2 and E3 are used to evaluate the cost of different orderings as follows:

$$c(F1)+s(F1)*c(C2)=10+0.1*11=11.1$$

$$c(C2)+s(C2)*c(F1)=11+0.9*10=20$$

From this, F1 is cheaper and should precede C2. The cost of the node 301, being the root of the entire tree 350, is not evaluated because all preceding nodes within the tree 350 have been evaluated and ordered based on said evaluation.

Figure 8:
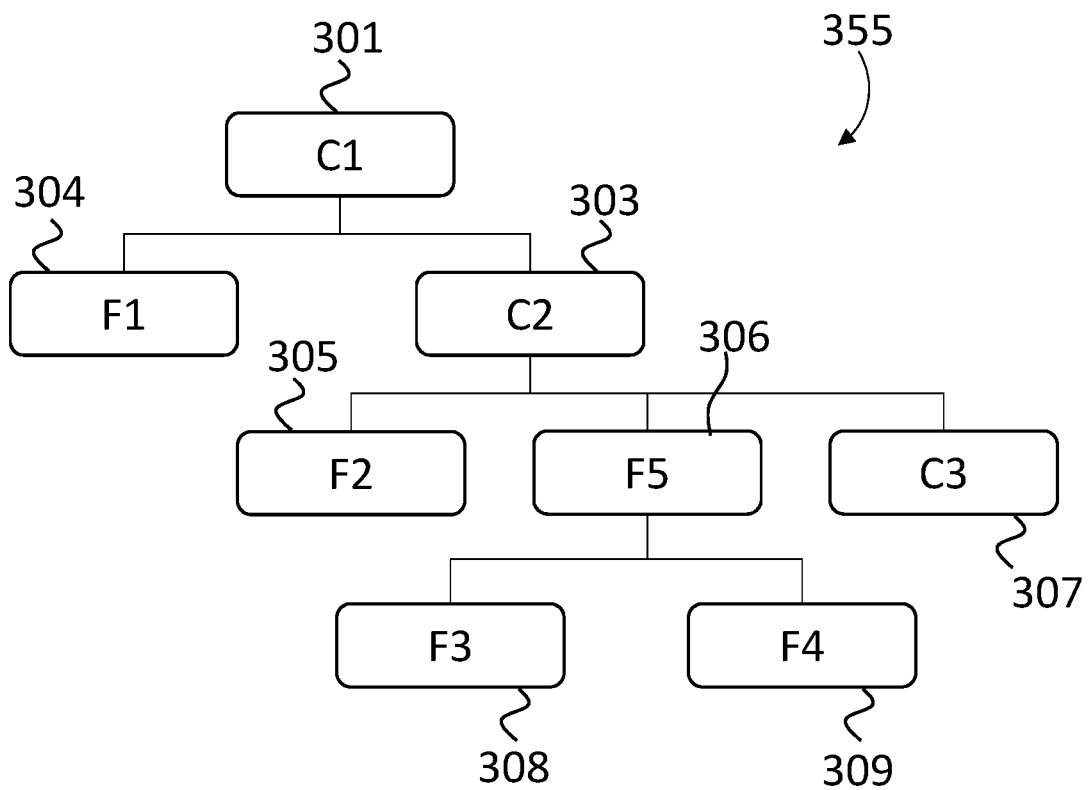
FIG. 8 is a schematic diagram of an ordered filter tree; according to an example.

FIG. 8 is a schematic diagram of an ordered filter tree 355, ordered based on the evaluation of the worked example described in relation to FIG. 7.

Figure 9:
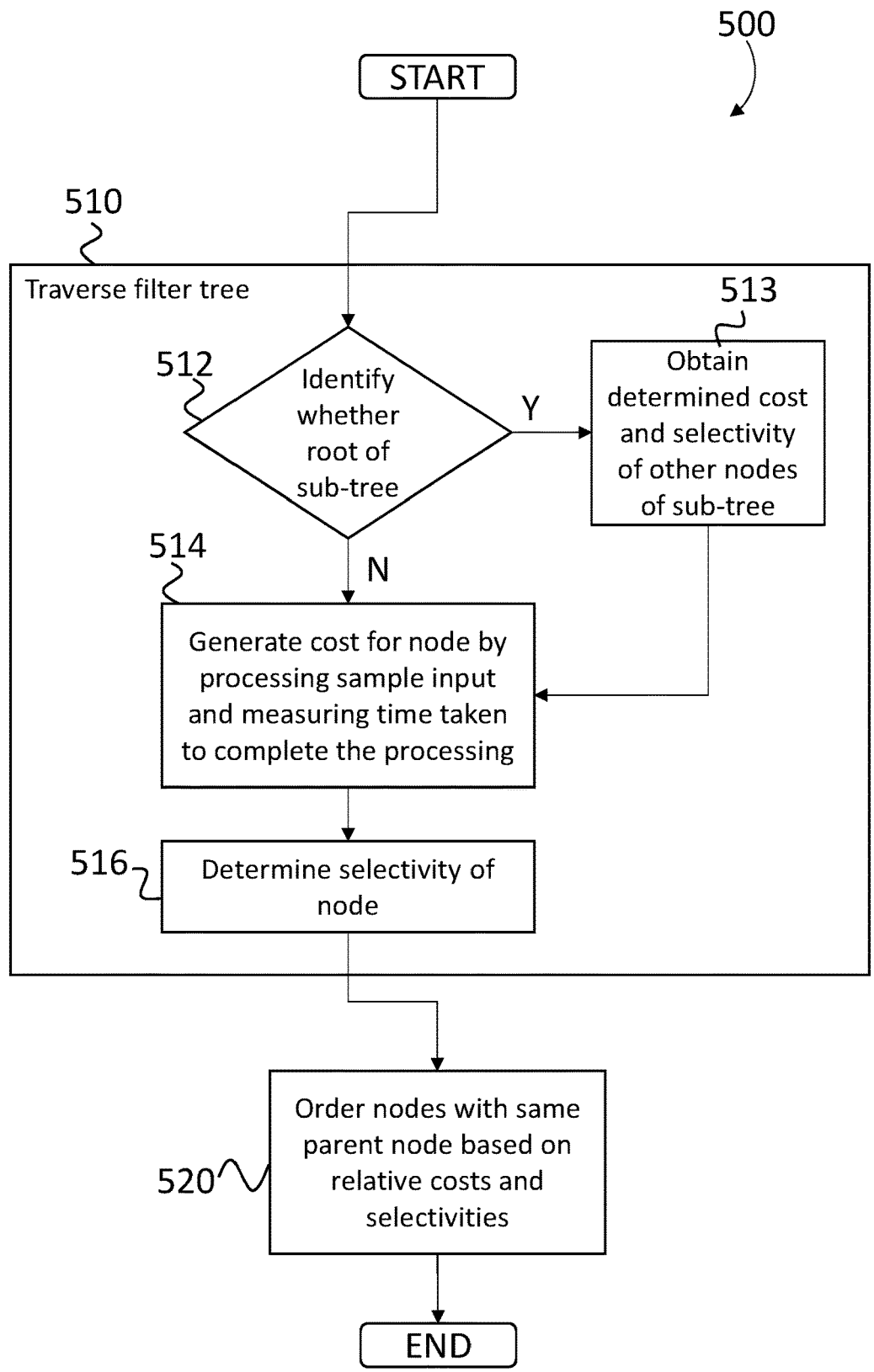
FIG. 9 is a flowchart of a method of evaluating a set of filter parameters represented by a filter tree, according to an example.

FIG. 9 is a flowchart of a method 500 of evaluating a set of filter parameters represented by a filter tree, where the filter tree comprises a plurality of nodes of at least one parent node and at least one child node and each node contains a filter parameter.

The method 500 starts at block 510 where the filter tree is traversed. In traversing the filter tree, the method 500 proceeds to block 512 where, for each node, an identification is made as to whether said node is a root of a sub-tree comprising other nodes of the filter tree.

If the node is not a root of a sub-tree, the no, N, branch is followed and the method 500 proceeds directly to block 514. If the node is identified to be a root of a sub-tree the method 500, the yes, Y, branch is followed and the method 500 proceeds to block 513 where a determined cost and selectivity of the other nodes of the sub-tree are obtained for use in the costing process of block 514. Subsequently, the method 500 proceeds to block 514 after block 513.

At block 514, a cost for the node is generated by processing by processing a sample input using the filter parameter of the node and measuring the time taken to complete the processing.

Next, the method proceeds to block 516 where a selectivity of the node is determined based on an output resulting from the processing of the sample input using the filter parameter.

Following the traversal of the tree, the method 500 proceeds to block 520, where at least some of the plurality of nodes of the filter tree, that have the same parent node, are ordered based on their relative costs and selectivities, for use in generating an ordered filter tree for the set of filter parameters. The ordered filter tree may be a re-ordered said filter tree 350 or a new filter tree.

Using a Re-Ordered Filter Tree in Query Processing

As described in relation to FIG. 2, after a sample input 220 has been processed by the query processing engine 110, a segment input 240 may be received by the query execution engine 130. The segment input 240 may comprise a predetermined number of different data items to those of the sample input 220.

In accordance with embodiments described herein the query execution engine 130 proceeds to process the segment input 240 using a reordered tree, such as the tree 355 (FIG. 8), that was generated as a result of the evaluation performed by the query processing engine 110 using the sample input 220. In other words, the sample input 220 is used for the purposes of evaluating the efficiency of a set of filter parameters and to generate an optimized set of filter parameters. The segment input 240 is then filtered using that optimized set of filter parameters, which in examples disclosed herein takes the form of a re-ordered tree 355 of nodes. Consequently, filtering of the segment input 240 is performed efficiently with reduced time taken to provide a query response. The result of the filtering of the segment 240 is the output generated after each filter parameter has been invoked, which typically forms the basis of the query response.

The above examples are to be understood as illustrative. It is to be understood that any feature described in relation to any one example may be used alone, or in combination with other features described, and may also be used in combination with one or more features of any other of the examples, or any combination of any other of the examples. Furthermore, equivalents and modifications not described above may also be employed.

What is claimed is:

1. A computer-implemented method of processing a query in a database management system, the query defining a set of filter parameters and at least one Boolean operator, the method comprising:

evaluating the set of filter parameters and the at least one Boolean operator, the set of filter parameters and the at least one Boolean operator being represented by a filter tree comprising a plurality of nodes of at least one parent node having a said Boolean operator and at least one child node having a said filter parameter, the evaluating comprising:

transforming the filter tree by:

replacing any parent node that has a single child node with said single child node; and replacing any parent node that has at least one child node and that contains the same filter parameter as its own parent node, with the at least one child node of that parent node;

such that each parent node has a plurality of child nodes that do not contain the same filter parameter as said parent node;

traversing the transformed filter tree by, for each node of the plurality of nodes:

identifying whether said node is a root of a sub-tree comprising other nodes of the transformed filter tree;

generating a cost for said node by processing a sample input comprising a plurality of data items of a data source using the filter parameter and measuring the time taken for the plurality of data items to be processed, wherein if said node is identified as a root of a sub-tree, said cost is also based on a determined cost and selectivity of the other nodes of the sub-tree; and determining a selectivity of said node based on an output of its filter parameter as a result of processing the sample input using the filter parameter;

re-ordering at least some of the plurality of nodes of the transformed filter tree having the same parent node based on their relative costs and selectivities to generate a re-ordered filter tree for the set of filter parameters; and processing a second input comprising a predetermined number of different data items of the data source against the re-ordered filter tree in order to generate an output representative of at least one data item of the different data items that satisfies each of the filter parameters of the re-ordered filter tree; and generating a query response that includes the output.

2. The computer-implemented method of claim 1, wherein the set of filter parameters of the filter tree is defined by a query received by a database management system.

3. The computer-implemented method of claim 1, wherein the traversing and ordering are part of a runtime profiling analysis performed by the database management system.

4. The computer-implemented method of claim 1, wherein if said node is identified as a root of a sub-tree of the filter tree, the cost of the node is based on a determined cost and selectivity of an established ordering of the filter parameters of the other nodes of the sub-tree.

5. The computer-implemented method of claim 4, wherein the ordering of the filter parameters of the other nodes of the sub-tree is established by selecting a lowest cost ordering from a plurality of orderings.

6. The computer-implemented method of claim 1, wherein the output of the filter parameter of said node defines the sample input for the next node of the filter tree.

7. The computer-implemented method of claim 6, wherein the output is a bit or byte vector comprising one or more set bits corresponding to one or more data items that form the sample input for the next node of the filter tree.

8. The computer-implemented method of claim 7, further comprising updating the bit or byte vector as the filter tree is traversed.

9. The computer-implemented method of claim 1, wherein if the node is identified as a root of a sub-tree of the filter tree, the output is representative of one or more data items of the sample input that satisfy the filter parameter of the respective node and the filter parameters of the other nodes of the sub-tree.

10. The computer-implemented method of claim 1, wherein the ordered filter tree is a re-ordered said filter tree or a new filter tree.

11. An ordered filter tree generated in accordance with the method of claim 1.

* * * * *